(12) United States Patent
Gosk et al.

(10) Patent No.: US 6,540,299 B1
(45) Date of Patent: Apr. 1, 2003

(54) CONTROLLING HEADREST ACCORDING TO OCCUPANT SIZE IN A VEHICLE

(75) Inventors: Randal Gosk, Troy, MI (US); Mohannad Murad, Troy, MI (US); Hossam Almasri, Detroit, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 10/161,733

(22) Filed: Jun. 5, 2002

(51) Int. Cl.$^7$ ................................................ B60R 22/28
(52) U.S. Cl. ........................ 297/410; 297/344.1; 297/61
(58) Field of Search ................................. 297/391, 410, 297/344.1, 61, 217.3

(56) References Cited

U.S. PATENT DOCUMENTS

| | | | |
|---|---|---|---|
| 4,285,545 A | * | 8/1981 | Protze |
| 4,811,226 A | | 3/1989 | Shinohara .............. 364/424.05 |
| 4,944,554 A | * | 7/1990 | Gross et al. |
| 5,054,856 A | | 10/1991 | Wang .......................... 297/408 |
| 5,071,190 A | * | 12/1991 | Tame |
| 5,171,062 A | * | 12/1992 | Courtois |
| 5,324,071 A | | 6/1994 | Gotomyo et al. ........... 280/730 |
| 5,669,666 A | | 9/1997 | Lee ............................. 297/408 |
| 5,836,651 A | | 11/1998 | Szerdahelyi et al. ........ 297/410 |
| 5,918,940 A | * | 7/1999 | Wakamatsu et al. |
| 6,062,644 A | | 5/2000 | Lance .......................... 297/410 |

* cited by examiner

Primary Examiner—Milton Nelson, Jr.
(74) Attorney, Agent, or Firm—Jarett Rieger

(57) ABSTRACT

A vehicle seat and a seat headrest are adjustable to accommodate seat occupants of varying heights. The headrest, height and seat position are adjusted together by connecting the headrest drive motor and the seat drive motor to a single control switch. The headrest has a smaller total distance of travel in relation to the travel distance of the vehicle seat. The headrest motor may drive a thread with a smaller pitch. Alternatively, there may be employed pulse width modulation of the electrical power supplied by a common switch or a similar device to create a proportional relationship between the motion of the headrest and the vehicle seat.

9 Claims, 2 Drawing Sheets

CONTROLLING HEADREST ACCORDING TO OCCUPANT SIZE IN A VEHICLE

FIELD OF THE INVENTION

The present invention relates to adjustable vehicle seats which include an adjustable headrest.

BACKGROUND OF THE INVENTION

The adjustable vehicle seat headrest was introduced, at least in part, as a safety device to support the head of an occupant during a vehicle crash. To function properly the position of the headrest should be adjusted to the height of the individual occupying the seat to which the headrest is mounted. Often, in modern vehicles, the various possible movements of the seat have been motorized and are readily adjusted by the seat occupant. However, although the occupant is strongly motivated to adjust the seat for comfort, the position of the headrest often does not contribute to an immediate sense of comfort and therefore is at times not adjusted to conform to the occupant's height. Thus the headrest may be adjusted to improve perceived visibility, or simply left in the position in which it is found.

To maximize the benefits to be gained from a headrest, it is desirable that the headrest always be properly positioned. Therefore, a system for adjusting the headrest which does not depend on the occupant directly adjusting the headrest is desirable.

SUMMARY OF THE INVENTION

The vehicle seat of this invention is mounted for motorized adjustment with respect to the steering wheel, or front of the vehicle, to accommodate seat occupants of varying heights. The vehicle seat has mounted thereto a headrest which is also mounted for motorized adjustment so that the position of the headrest may be adjusted to accommodate seat occupants of varying heights. The seat position drive mechanism, and the headrest drive mechanism are designed to be driven together so that the seat occupant, when adjusting the seat position, will simultaneously adjust the headrest height by an amount proportional to the position to which the seat is adjusted. The headrest height and seat position can be driven together by the simple expedient of connecting the headrest drive motor and the seat drive motor to a single control switch. Because the headrest has a smaller total distance of travel as compared to the vehicle seat, the headrest motor may drive a thread with a smaller pitch. Another approach for controlling the relative movement of the headrest with respect to the vehicle seat is to use pulse width modulation of the electrical power supplied by the common switch, thus reducing the effective speed of the headrest motor. A further approach is to design the motors to incorporate gears or other mechanisms whereby the headrest motor causes the headrest screw to rotate at a slower speed than the seat positioning screw.

It is a feature of the present invention to provide a vehicle seat where independent adjustment of headrest height is not required.

It is another feature of the present invention to provide a vehicle seat where the headrest height and seat position are linked together.

Further objects, features and advantages of the invention will be apparent from the following detailed description when taken in conjunction with the accompanying drawings.

DETAILED DESCRIPTION OF THE INVENTION

Figure 1:
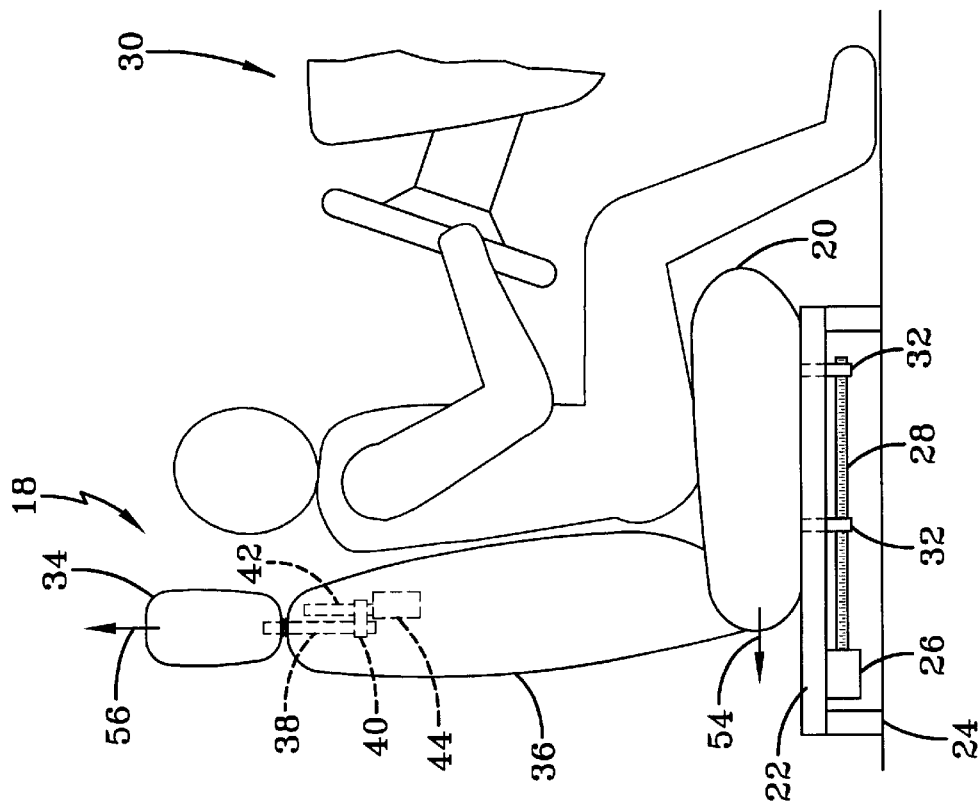
FIG. 1 is side elevational view of the vehicle seat assembly of this invention with the vehicle seat positioned toward the front of a vehicle.
Figure 2:
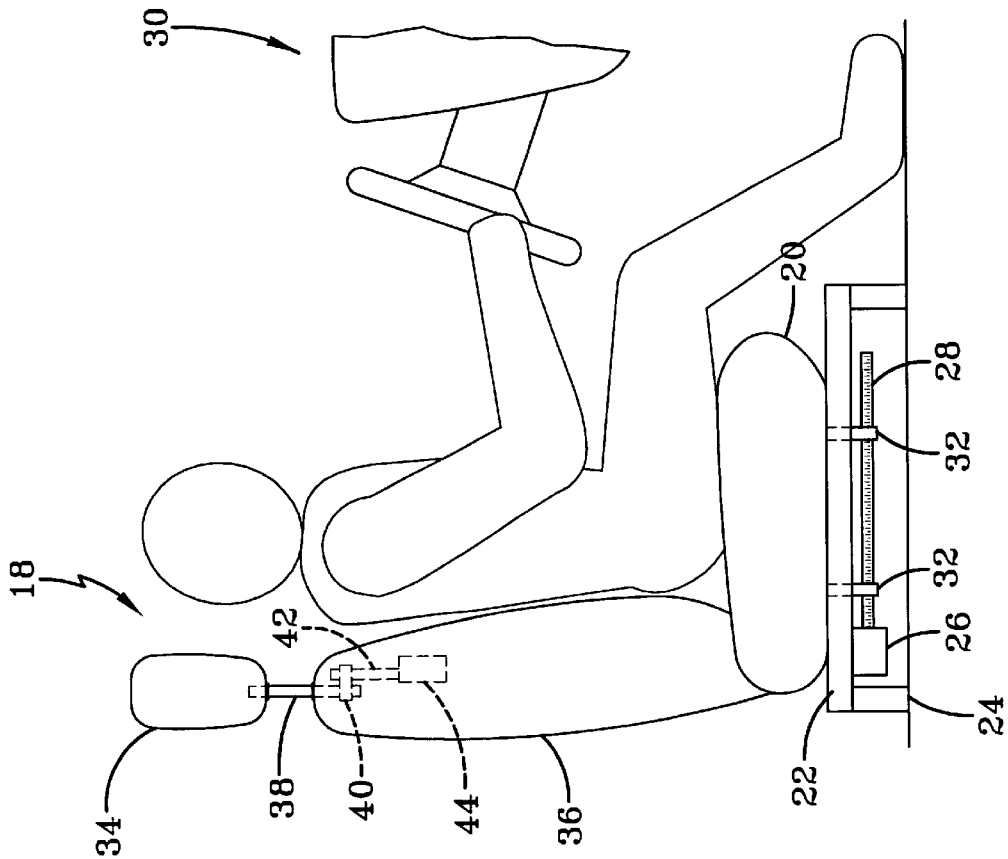
FIG. 2 is a side elevational view of the vehicle seat assembly of FIG. 1 with the seat spaced from the front of the vehicle with an extended headrest.
Figure 3:
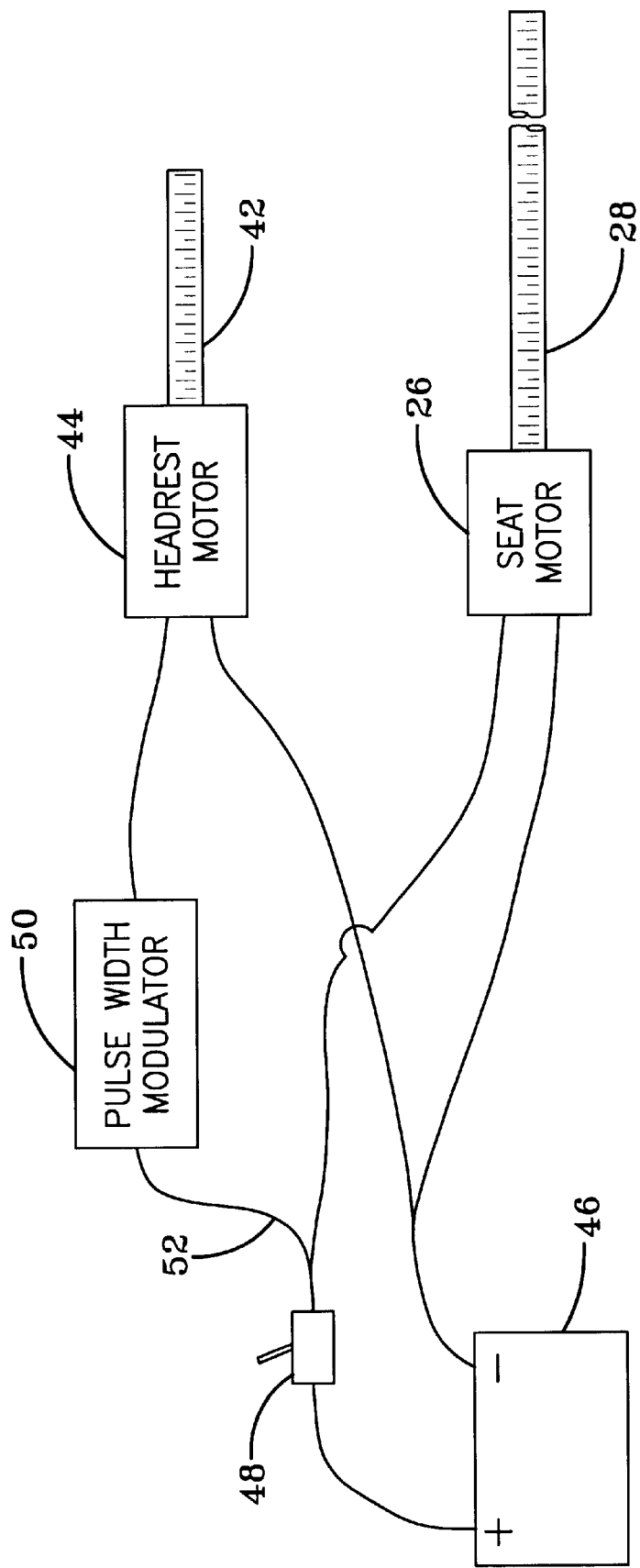
FIG. 3 is a schematic view of the control system for simultaneously positioning the seat of FIG. 1 and the headrest mounted thereto.

Referring more particularly to FIGS. 1–3, wherein like figures referred to similar parts, a vehicle seat assembly 18 including a vehicle seat 20 is shown in FIGS. 1 and 2. The vehicle seat 20 is mounted to a track 22 mounted to a vehicle 24. The seat 20 is driven with respect to the track 22 by a seat drive motor 26 which turns a drive screw 28 which positions the seat with respect to the front 30 of the vehicle 24. The seat 20 is driven by nuts 32 which cause the seat 20 to move forward and backward as the motor 26 causes the screw 28 to rotate first one direction and then the other. A headrest 34 is mounted to the back 36 of the seat 20 on a support rod 38, and optionally one or more guide rods (not shown). The support rod 38 is mounted by a drive nut 40 to a headrest drive screw 42 which is mounted to and driven by a headrest motor 44. As shown in FIG. 1, the seat drive motor 26 and the headrest motor 44 are connected in parallel to a power source 46 such as the vehicle battery, with a single switch 48 controlling the flow of power to both motors 26, 44. A pulse width modulator 50 is positioned in the power supply line 52 to the headrest motor. When the switch 48 is held in the on position, power is supplied to both motors 26, 44 which drive the seat 20 in the rearward direction, as shown by arrow 54, while at the same time driving the headrest 34 in the up direction as indicated by arrow 56.

The upward displacement of the headrest 34 is proportional to the displacement of the vehicle seat 20 on the track 22, for example the seat 20 may have a total travel distance of about eighteen inches, and the headrest 34 may have a corresponding total travel distance of about 5 inches, so that the headrest movement is about thirty percent of the linear displacement of the vehicle seat 20 along the track 22. The proportionate relationship between the upward displacement of the headrest 34 and the horizontal displacement of the seat 20 can be fixed by using a seat drive screw 28 and a headrest drive screw 42 which have the same pitch and are driven by similar motors, and by modulating the amount of power supplied to the headrest drive motor 44 with the pulse width modulator 50, so as to create the desired proportionate relationship between the upward motion of the headrest 34 and backward motion of the seat 20. Alternatively, the pitch of the headrest drive screw 42 may be adjusted with respect to the pitch of the seat drive screw 28 so as to create the desired proportionality of movement. A further alternative is to incorporate in the design of the motors by means of a gearbox or otherwise the desired proportionality. Two or more of the foregoing approaches could also be combined. The pulse width modulation technique has the advantage that the proportionality can be adjusted by a simple change in programming which might be affected for different vehicle models, or in response to a vehicle owner's input.

The vehicle seat 20 may therefore have a single switch 48 conventionally mounted on the armrest or on the side of the seat to adjust the horizontal position of the seat 20 while simultaneously affecting the adjustment of the headrest 34 height. Thus, while the driver or seat occupant is effecting the most straightforward and necessary adjustment for comfort, i.e., lateral position of the seat, the headrest height will simultaneously be optimally positioned. Headrest height is normally difficult to adjust because it is behind the driver and most often the head is not actually engaged with the headrest, making it difficult to remember and assess how the headrest should be positioned for maximum safety.

It should be understood that where a seat position memory system is used the seat memory logic will control the power switch 46 to simultaneously position in proportional relation the seat position and the headrest height. It will also be understood that the proportional relationship between the height of the headrest and the lateral position of the seat with respect to the front of the vehicle is maintained when the seat is moving toward the front of the vehicle and the headrest height is decreasing, and when the seat is moving away from the front of the vehicle with the headrest height increasing. It should be further understood that the proportionality between the seat position and headrest position could be linear or nonlinear.

It should be understood that the switch 48 which controls the headrest motor 44 and the seat motor 26 can be operated by the seat occupant's hand or other extremity.

It should be understood that the vertical motion of the vehicle headrest, and the horizontal motion of the vehicle seat can be caused by any mechanical drive train such as those employing drive screws, worm gears, drive belts, linear actuators, or a rack and pinion, in ways well-known to those skilled in the art of causing mechanical motion.

It is understood that the invention is not limited to the particular construction and arrangement of parts herein illustrated and described, but embraces all such modified forms thereof as come within the scope of the following claims.

We claim:

1. A motor vehicle seat assembly comprising:
   a vehicle seat track;
   a vehicle seat having a seat back, the vehicle seat being mounted for sliding motion on the vehicle seat track;
   a vehicle seat motor and seat drive train connected in driving relation between the vehicle seat track and the vehicle seat to cause a horizontal movement of the vehicle seat along the seat track;
   a headrest mounted to the seat back for a vertical movement with respect to the seat back;
   a headrest motor and headrest drive train connected in driving relation between the seat back and the headrest to cause the headrest to move upwardly of the seat back; and
   a switch connected to the headrest motor and the seat motor so that operation of the switch simultaneously connects or disconnects the headrest motor and seat motor to a power supply.

2. The motor vehicle seat assembly of claim 1 wherein the vehicle seat drive train further comprises a drive screw with a first pitch, and wherein the headrest drive train further comprises a drive screw with a second smaller pitch so that when the switch is operated to simultaneously connect the headrest motor and the seat motor to a power supply, the headrest travels upwardly of the seat back a distance which is proportional to, but less than, the horizontal displacement of the vehicle seat.

3. The motor vehicle seat assembly of claim 1 further comprising a power supply line between the switch and a pulse width modulator and between the pulse width modulator and the headrest motor so that power supplied to the headrest motor can be modulated.

4. A motor vehicle seat assembly comprising:
   a track;
   a car seat having a seat back, the car seat mounted for horizontal motion along the track;
   a headrest mounted for vertical motion with respect to the seat back; and
   a means for simultaneously causing vertical motion of the headrest with respect to the seat back and horizontal motion of the vehicle seat along the track to cause a vertical displacement of the headrest with respect to the seat back and a horizontal displacement of the vehicle seat along the track, so that the vertical displacement of the headrest is proportional to and less than the horizontal displacement of the vehicle seat, so that when the vehicle seat is adjusted horizontally along the track the headrest is proportionally adjusted to accommodate a vehicle seat occupant, wherein the means for simultaneously causing vertical motion of the headrest with respect to the seat back and horizontal motion of the vehicle seat along the track includes a vehicle seat drive train with a drive screw with a first pitch, and a headrest drive train includes a drive screw with a second smaller pitch so that when the first drive screw and the second drive screw are simultaneously driven, the headrest travels upwardly of the seat back in a proportional relationship to but less than the horizontal displacement of the vehicle seat.

5. The motor vehicle seat assembly of claim 4 wherein the means for simultaneously causing vertical motion of the headrest with respect to the seat back and horizontal motion of the vehicle seat along the track includes an extremity operated switch for simultaneously causing motion of the headrest and vehicle seat.

6. A motor vehicle seat assembly comprising:
   a track;
   a car seat having a seat back, the car seat mounted for horizontal motion along the track;
   a headrest mounted for vertical motion with respect to the seat back; and
   a means for simultaneously causing vertical motion of the headrest with respect to the seat back and horizontal motion of the vehicle seat along the track to cause a vertical displacement of the headrest with respect to the seat back and a horizontal displacement of the vehicle seat along the track, so that the vertical displacement of the headrest is proportional to and less than the horizontal displacement of the vehicle seat, so that when the vehicle seat is adjusted horizontally along the track the headrest is proportionally adjusted to accommodate a vehicle seat occupant, the means for simultaneously causing vertical motion of the headrest with respect to the seat back and horizontal motion of the vehicle seat along the track includes, a power supply line between a switch and a pulse width modulator and between the pulse width modulator and a headrest motor so that power supplied by the switch to a headrest motor is modulated, to cause less vertical motion of the headrest as compared to the vehicle seat.

7. A method of controlling a vertical position of a headrest mounted on a seat back on a vehicle seat, comprising the steps of:
   driving a vehicle seat horizontally with respect to a vehicle seat track by a first electric motor connected to a first mechanical drive train; and
   simultaneously driving a headrest vertically with respect to the seat back of the vehicle seat by a second electric motor connected to a second mechanical drive train, so that a vertical displacement of the headrest is less than and proportional to the horizontal displacement of the vehicle seat.

8. The method of claim 7 wherein the first drive motor causes a first drive screw having a first pitch to rotate, and wherein the second drive motor causes a second drive screw having a second pitch to rotate, and wherein the second pitch is sufficiently less than the first pitch to cause the proportional displacement of the headrest with respect to the horizontal displacement of the vehicle seat.

9. The method of claim 7 wherein the second electric motor is caused to rotate proportionally less than the first electric motor by a pulse width modulator which modulates power supplied to the second electric motor.

* * * * *